US010574469B1

(12) United States Patent
Garni et al.

(10) Patent No.: US 10,574,469 B1
(45) Date of Patent: Feb. 25, 2020

(54) PHYSICALLY UNCLONABLE FUNCTION AND METHOD FOR GENERATING A DIGITAL CODE

(71) Applicant: NXP USA, INC., Austin, TX (US)

(72) Inventors: Brad John Garni, Austin, TX (US); Nihaar N. Mahatme, Austin, TX (US); Alexander Hoefler, Austin, TX (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/380,274

(22) Filed: Apr. 10, 2019

(51) Int. Cl.
| H04L 9/32 | (2006.01) |
| G06F 3/06 | (2006.01) |
| G11C 11/41 | (2006.01) |
| H03K 19/0944 | (2006.01) |
| G06F 12/14 | (2006.01) |
| G11C 11/418 | (2006.01) |
| G11C 11/419 | (2006.01) |

(52) U.S. Cl.
CPC .......... *H04L 9/3278* (2013.01); *G06F 3/0622* (2013.01); *G06F 3/0653* (2013.01); *G06F 12/1408* (2013.01); *G11C 11/418* (2013.01); *G11C 11/419* (2013.01); *H03K 19/0944* (2013.01)

(58) Field of Classification Search
CPC ... G06F 21/79; H04L 9/3278; H04L 2209/12; G11C 11/4078; G11C 11/4091; G11C 11/4094; G11C 16/24; G11C 16/28; G11C 11/412; G11C 11/418; G11C 16/26; G11C 7/00; H03K 19/003; H03K 19/0944
See application file for complete search history.

(56) References Cited

U.S. PATENT DOCUMENTS

| 6,600,690 B1 | 7/2003 | Nahas et al. |
| 6,700,814 B1 | 3/2004 | Nahas et al. |
| 8,380,768 B2 | 2/2013 | Hoefler |
| (Continued) | | |

FOREIGN PATENT DOCUMENTS

WO   PCT-2017117663 A1   7/2017

OTHER PUBLICATIONS

Claes, Mathias, et al.; "Comparison of SRAM and FF PUF in 65nm Technology;" Information Security Technology for Applications (Peeter Laud, ed.), Lecture Notes in Computer Science, vol. 7161, Springer Berlin / Heidelberg, 2012, pp. 47-64.
(Continued)

*Primary Examiner* — Vibol Tan
(74) *Attorney, Agent, or Firm* — Daniel D. Hill

(57) ABSTRACT

A physically unclonable function (PUF) is implemented using a PUF array of single-transistor cells organized as a plurality of word lines and intersecting bit lines. A single-transistor cell is connected to a word line and bit line at each of the intersections. A current source is coupled to each of the bit lines and provides a current when a PUF cell connected to the bit line is conductive. The bit lines are organized in pairs. A PUF evaluation engine is coupled to the PUF array and provides an address for selecting a word line of the PUF array in response to a challenge. A comparator is coupled to each pair of bit lines of the PUF array for detecting a current. The comparator provides a voltage signal in response to detecting a difference current between the first and second bit line. The PUF evaluation engine receives the voltage signal and generates a logic bit.

13 Claims, 3 Drawing Sheets

(56) References Cited

U.S. PATENT DOCUMENTS

| | | | |
|---|---|---|---|
| 8,848,477 | B2 | 9/2014 | Schrijen et al. |
| 9,497,027 | B2* | 11/2016 | Chen .................... H04L 9/3278 |
| 9,649,228 | B2* | 5/2017 | Robles .............. A61F 13/15203 |
| 9,870,811 | B2* | 1/2018 | Wang ................. G11C 11/1675 |
| 9,934,411 | B2 | 4/2018 | Kwong et al. |
| 9,947,391 | B1* | 4/2018 | Mahatme .............. G11C 11/419 |
| 9,966,954 | B1* | 5/2018 | Yang ............... H03K 19/00315 |
| 10,032,521 | B2* | 7/2018 | Grigoriev ................ G11C 7/24 |
| 10,069,628 | B2* | 9/2018 | Tomishima .......... G11C 11/161 |
| 10,164,640 | B1* | 12/2018 | Lu ........................... G06F 21/73 |
| 2015/0278551 | A1* | 10/2015 | Iyer ........................ G06F 21/70 726/2 |
| 2017/0288885 | A1 | 10/2017 | Zadeh |
| 2018/0102163 | A1* | 4/2018 | Lin ...................... G11C 11/419 |

OTHER PUBLICATIONS

Schrijen, Geert-Jan et al.; "Comparative Analysis of SRAM Memories Used as PUF Primitives;" Proceedings of the Conference on Design, Automation and Test in Europe, pp. 1319-1324. EDA Consortium, 2012.

Mispan, Mohd Syafiq, et al.; "NBTI Aging Evaluation of PUF-Based Differential Architectures;" 2016 IEEE 22nd International Symposium on On-Line Testing and Robust System Design (IOLTS); Jul. 4 — 6, 2016; Sant Feliu de Guixols, Spain; DOI: 10.1109/IOLTS.2016.7604680.

Mispan, Mohd Syafiq, et al.; "TCO-PUF: A Subthreshold Physical Unclonable Function;" 2015 11th Conference on Ph.D. Research in Microelectronics and Electronics (PRIME); Jun. 29-Jul. 2, 2015; Glasgow, UK; Doi: 10.1109/PRIME.2015.7251345.

Semis, Georgios, et al.; "Evaluation of 90nm 6T-SRAM as Physical Unclonable Function for Secure Key Generation in Wireless Sensor Nodes;" 2011 IEEE International Symposium of Circuits and Systems (ISCAS); May 15-18, 2011; Rio de Janeiro, Brazil; DOI: 10.1109/ISCAS.2011.5937628.

Suh, G. Edward, et al.; "Physical Unclonable Functions for Device Authentication and Secret Key Generation;" 2007 44th ACM/IEEE Design Automation Conference; Jun. 4-8, 2007; San Diego, California.

U.S. Appl. No. 16/260,751; Inventor, Mahatme, Nihaar N. et al.; "SRAM Based Physically Unclonable Function and Method for Generating A PUF Response;" filed Jan. 29, 2019.

Zhang, Xian, et al.; "A Novel PUF Based on Cell Error Rate Distribution STT-RAM;" 2016 21st Asia and South Pacific Design Automation Conference (ASP-DAC); Jan. 25-28, 2016; Macau, China; DOI: 10.1109/ASPDAC.2016.7428035.

* cited by examiner

US 10,574,469 B1

PHYSICALLY UNCLONABLE FUNCTION AND METHOD FOR GENERATING A DIGITAL CODE

BACKGROUND

Field

This disclosure relates generally to electronic circuits and more specifically to a physically unclonable function (PUF) and method for generating a digital code.

Related Art

A physically unclonable function (PUF) is a physical system that will produce an unpredictable response when a stimulus is input. One example of a PUF uses the power-up state of a static random-access memory (SRAM). However, manufacturing variations, temperature, power supply, switching noise, device aging, and other factors may cause some of the cells of the PUF to power-up in different states at different times. Also, an implementation of the SRAM based PUF using a 6-transistor SRAM cell requires a relatively large amount of area on an integrated circuit (IC).

Because no two integrated circuits are exactly alike, the output of the PUF is difficult to predict, and therefore difficult to recreate. This makes the PUF useful for storing unique information about the IC. For example, the PUF may be used to generate a digital signature or encryption/decryption key.

Therefore, a need exists for a way to implement a PUF and to provide a digital code using the PUF that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
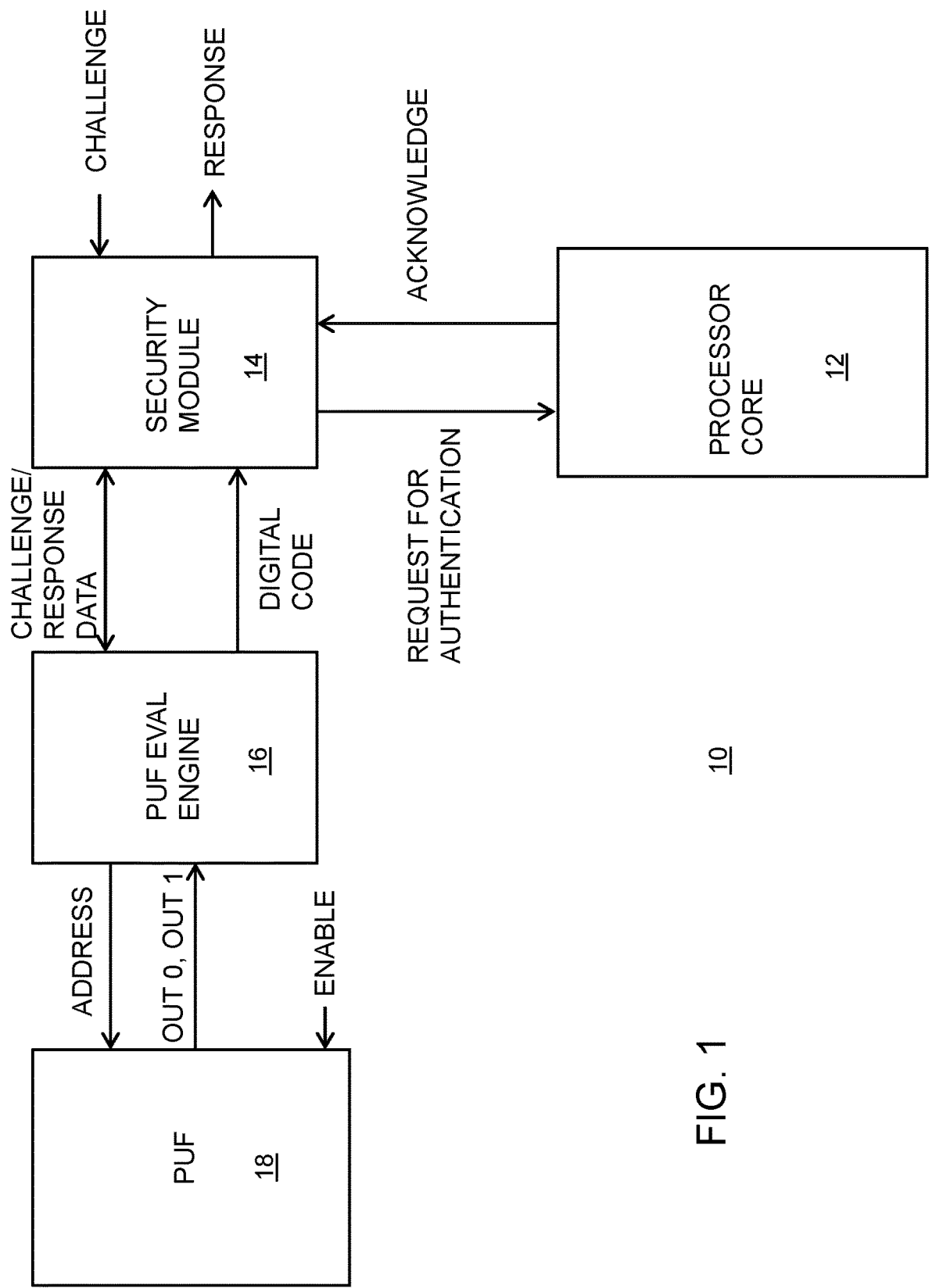
FIG. 1 illustrates a system in accordance with an embodiment.

Generally, there is provided, a data processing system having a PUF implemented as an array of PUF cells coupled to bit lines and word lines. Each of the PUF cells includes an N-channel transistor having a drain connected to a bit line and a gate connected to a word line. The sources of the transistors are connected to a predetermined potential, for example, the sources may be connected to ground. In one embodiment, the bit lines may be connected to a current source. The bit lines are organized as pairs of bit lines. A first bit line of each pair of bit lines is connected to a first input of a comparator, and a second bit line of each pair bit lines is connected to a second input of the comparator. A method is provided for generating a digital code in a data processing system using the PUF array. In the method, an address is provided to select a word line. The selected word line causes the N-channel transistors connected to the word line to become conductive so that a current is generated in each of the first and second bit lines. Because of manufacturing variations, the bit line currents will be slightly different. During an evaluation of the bit line currents using the comparator, a read current of one of the bit lines is compared to a read current of another bit line. A voltage signal representing a logic state is provided by the comparator. The logic state of the voltage signal is used to generate a bit of a digital code having a plurality of bits. There may be a comparator for each pair of bit lines, or a few comparators may be shared between the bit lines of the array by way of multiplexing. In one embodiment, adjacent bit lines are used to form the bit line pairs. In another embodiment, a selection circuit may be used to pair the bit lines in a different way to increase resistance to attack. The resulting digital code may be used to provide a signature for the data processing system. Because the herein disclosed PUF cells are not being accessed or enabled when not in use, the single-transistor PUF array of the disclosed embodiment will show less aging.

Implementing a single-transistor PUF array in this manner provides a more stable signature that is repeatable, resistant to aging, yet also provides high randomness while being more compact than the conventional SRAM PUF. Also, the disclosed PUF may provide high resistance to attack compared to other PUFs because, for example, the current difference between the bit lines may be relatively small.

In one embodiment, there is provided, in a physically unclonable function (PUF) including an array of single-transistor PUF cells arranged in rows and columns, a row including a word line and all the PUF cells coupled to the word line, a column including a bit line and all the PUF cells coupled to the bit line, a method for generating a digital code, the method including: selecting a word line to cause the PUF cells in a row to be conductive; coupling a first bit line of the PUF array to a first input of a comparator; coupling a second bit line of the PUF array to a second input of the comparator; detecting a difference current on the first and second bit lines using the comparator; outputting a voltage signal from the comparator corresponding to the difference current; and generating a logic bit using the voltage signal, the logic bit being a part of the digital code. The method may further include generating a current on the first and second bit lines using a current source coupled to each of the first and second bit lines before detecting the difference current. The method may further include receiving a challenge from a security module, wherein the digital code is generated in response to the challenge. Each PUF cell of the array of single-transistor PUF cells may include an N-channel transistor. Source terminals of the N-channel transistors of the first and second PUF cells may both be coupled to the same potential. The method may further include disabling the PUF after generating the logic bit. The array of single-transistor PUF cells may include a plurality of bit lines and a plurality of comparators, and wherein the method may further include: organizing the plurality of bit lines into a plurality of bit line pairs; and coupling each bit line pair to one of the plurality of comparators. A current source may be coupled to each of the first and second bit lines. The PUF may be implemented on an integrated circuit.

In another embodiment, there is provided, a method for generating a digital code using a physically unclonable function (PUF), the method including: providing an array of single-transistor PUF cells arranged in rows and columns, a row including a word line and all the PUF cells coupled to the word line, a column comprising a bit line and all the PUF cells coupled to the bit line, coupling a current source to the bit line of each of the columns; selecting a word line to cause the PUF cells in a row to be conductive; coupling the first bit line of the PUF array to a first input of a comparator; coupling the second bit line of the PUF array to a second input of the comparator; detecting a difference current on the first and second bit lines using the comparator; outputting a voltage signal from the comparator corresponding to the difference current; and generating a logic bit using the voltage signal, the logic bit being a part of the digital code. The method may further include receiving a challenge from a security module, wherein the digital code is generated in response to the challenge. Each PUF cell of the array of single-transistor PUF cells may include an N-channel transistor. Source terminals of the N-channel transistors may be coupled to ground potential. The method may further include disabling the PUF after generating the logic bit. The array of single-transistor PUF cells may include a plurality of bit lines and a plurality of comparators, and wherein the method may further include organizing the plurality of bit lines into a plurality of bit line pairs; and coupling each bit line pair to one of the plurality of comparators.

In yet another embodiment, there is provided, a physically unclonable function (PUF) including: a PUF array of single-transistor cells organized as a plurality of word lines intersecting a plurality of bit lines, a single-transistor cell coupled to a word line and a bit line at each of the intersections; a current source coupled to each of the bit lines; a plurality of comparators, each comparator coupled to a pair of bit lines of the PUF array, a comparator detecting a difference current on the first and second bit lines and outputting a voltage signal from the comparator corresponding to the difference current; and a PUF evaluation engine coupled to the PUF array, the PUF evaluation engine providing an address for selecting a word line of the PUF array in response to a challenge, wherein the PUF evaluation engine receives the voltage signal from a comparator and generating a logic bit. The PUF array may be disabled after the voltage signal is generated. The PUF array of single-transistor cells may be further characterized as being an array of N-channel transistor cells. The data processing system may further include a security module for generating the challenge. The single transistor of the PUF array of single-transistor cells may be an N-channel transistor having a drain coupled to a bit line, a gate coupled to a word line, and a source coupled to ground.

FIG. 1 illustrates a data processing system 10 in accordance with an embodiment. Data processing system 10 includes processor core 12, security module 14, PUF evaluation engine 16, and PUF 18. Processor core 12 can be any kind of processor core, or a plurality of cores, for executing instructions. Processor core 12 is connected to security module 14 to provide an acknowledge signal ACKNOWL-EDGE when a request for authentication (REQUEST FOR AUTHENTICATION) is provided by security module 14. Security module 14 provides the REQUEST FOR AUTHENTICATION in response to receiving a challenge signal (CHALLENGE) from a requestor. PUF evaluation engine 16 may provide response data RESPONSE DATA in response to the CHALLENGE. To get the RESPONSE DATA, PUF evaluation engine 16 provides an address (ADDRESS) to PUF 18. In response, PUF 18 provides a PUF response from a PUF array as a plurality of voltage signals (OUT 0, OUT 1) back to PUF evaluation engine 16. PUF evaluation engine 16 evaluates the response and generates a digital code (DIGITAL CODE) from the plurality of voltage signals. The digital code is provided to security module 14 and used by security module 14 to generate a unique chip ID, encryption/decryption key, digital signature, or the like as a response (RESPONSE). Data processing system 10 may also include other circuits and modules not illustrated in FIG. 1. For example, data processing system 10 may include input/output circuits, memory, analog-to-digital converters, phase-locked loops, and the like, depending on the application.

Figure 2:
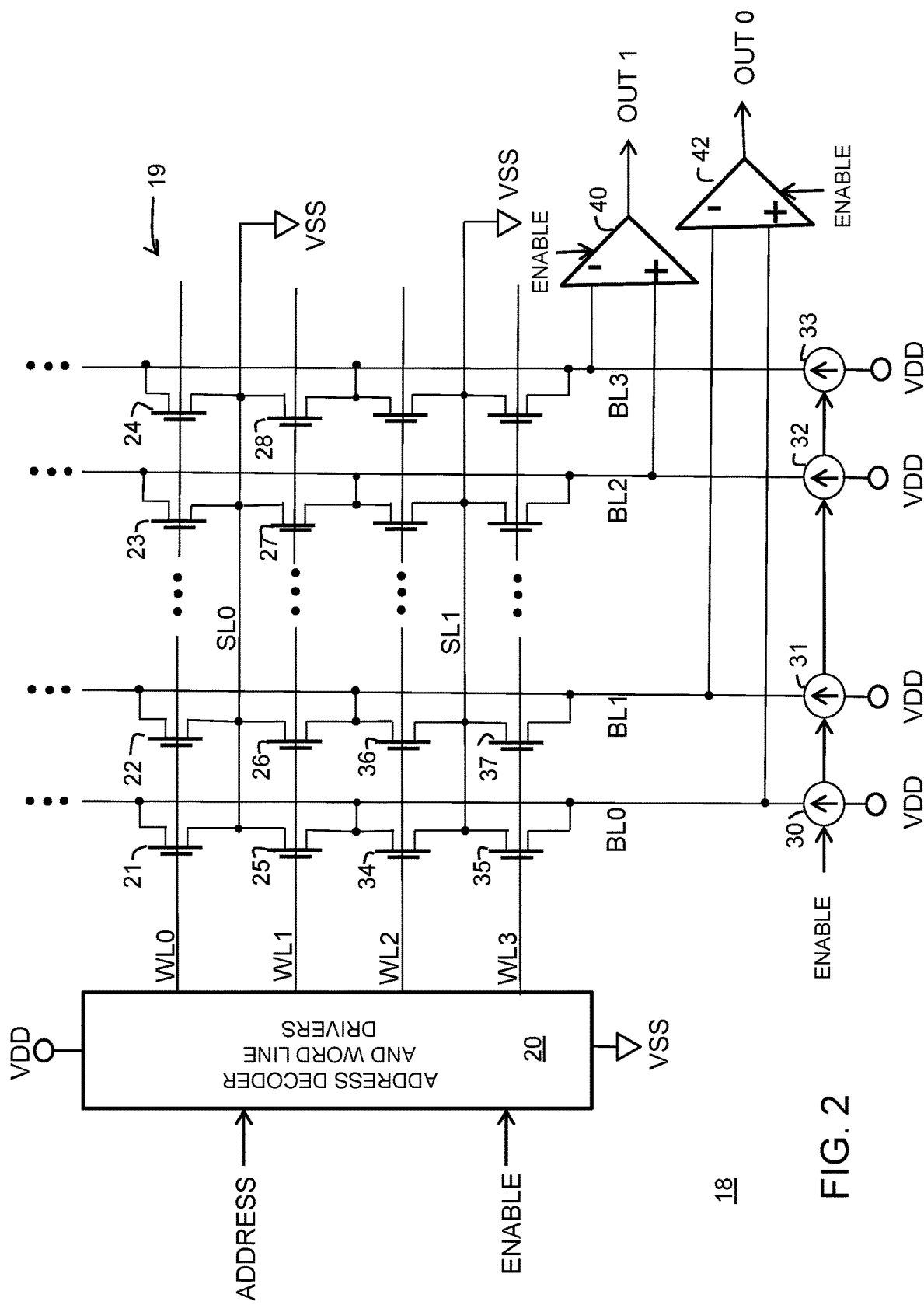
FIG. 2 illustrates the PUF of FIG. 1 in accordance with an embodiment.

FIG. 2 illustrates PUF 18 of FIG. 1 in accordance with an embodiment. PUF 18 includes PUF array 19, address decoder and word line drivers 20, current sources 30-33, and comparators 40 and 42. PUF array 19 includes an array of single-transistor PUF cells arranged in rows and columns. A row includes a word line and all the cells connected to the word line. For example, in PUF array 19, one row includes a word line labeled "WL0" and PUF cells 21-24 connected to word line WL0. Another row includes word line WL1 and PUF cells 25-28. Likewise, a column of PUF array 19 includes a bit line and all the PUF cells connected to the bit line. For example, one column includes a bit line labeled "BL0" and PUF cells 21, 25, 34, and 35. Another column includes bit line BL1 and PUF cells 22, 26, 36, and 37. More specifically, in FIG. 2, the single-transistor PUF cells are connected at intersections of the word lines and the bit lines. That is, each PUF cell is a single N-channel transistor connected at the intersection of a word line and a bit line. For example, the single-transistor of PUF cell 21 has a drain connected to bit line BL0, a gate connected to word line WL0, and a source connected to a source line labeled "SL0". The source lines SL0 and SL1 of PUF array 19 are connected to a predetermined potential, such as VSS in the illustrated embodiment. In the illustrated embodiment, VSS is connected to ground. As another example, PUF cell 25 has a drain connected to bit line BL0, a gate connected to word line WL1, and a source connected to SL0. The source line organization illustrated in FIG. 2 is for layout efficiency and may be different in other embodiments. The array of N-channel transistors may be implemented using a conventional complementary metal-oxide semiconductor (CMOS) manufacturing process.

Array 19 may have any number of bit lines and word lines. Each of bit lines BL0-BL3 is connected to one of current sources 30-33. Another embodiment may not use current sources connected to the bit lines. Also, the bit lines are organized in pairs, and each pair is connected to the inputs of a comparator, e.g. comparators 40 and 42. In one embodiment, current sources 30-33 may be implemented as part of the corresponding comparator 40 or 42. Word lines WL0-WL3 are each connected to address decoder and word line drivers 20. When a PUF response is read out of PUF array 19, address decoder and word line drivers 20 selects one of the word lines in response to receiving an address labeled "ADDRESS". The PUF cells connected to the selected word line will then provide a current path to VSS. In one embodiment, the bit line pairs are created using adjacent bit lines. In another embodiment, the bit line pairs may be created differently.

Comparators 40 and 42 are each coupled to a pair of bit lines. A first input of comparators 40 and 42 is labeled with a minus sign (−) and a second input is labeled with a plus sign (+). In FIG. 2, the pairs are made up of adjacent bit lines. In the illustrated embodiment, the comparator compares the currents on the pair of bit lines. A difference current between the bit lines of the pair of bit lines determines the voltage signal provided to PUF evaluation engine 16. In another embodiment, the comparators may compare bit line voltages or currents. The difference current may be relatively small, so the comparator should be able to reliably detect and evaluate the relatively small bit line currents. One example of a suitable circuit for doing the comparison is described in U.S. Pat. No. 6,600,690, by Nahas et al., "Sense Amplifier For A Memory Having At Least Two Distinct Resistance States", issued on Jul. 29, 2003, and is herein incorporated by reference in its entirety. In the illustrated embodiment of FIG. 2, a comparator is dedicated to each bit line pair. In another embodiment, the comparators may be shared with multiple bit line pairs using a switching or multiplexing circuit.

In FIG. 2, a power supply terminal labeled "VDD" is coupled to the circuits of PUF 18 to receive a positive power supply voltage and a power supply terminal labeled "VSS" is coupled to ground. In other embodiments, the power supply voltages may be different. In one embodiment, a selection circuit (not shown) may be included to select a predetermined number of bit lines in response to the challenge from security module 14. A word line is selected so that all the PUF signals connected to the selected word line are conductive. A bit line current is generated by the current source connected to a selected bit line along with the conductive PUF cell. In another embodiment, the current sources 30-33 and the supply terminals labeled VSS connected to them are not present, in which case the bit line current is generated exclusively by the conductive PUF cell. The bit line currents will be at least slightly different from each other for various reasons such as manufacturing variations in an integrated circuit in which the embodiment is implemented. A pair of PUF cells is used to generate one PUF response voltage signal that is output by a comparator. For example, word line WL0 may be enabled to make transistors 21 and 22 conductive. A current flows from each of current sources 30 and 31 to VSS through transistors 21 and 22 and a voltage between VDD and VSS is provided to the input terminals of comparator 42. Comparator 42 will detect a voltage difference on the bit lines because of the manufacturing variation and provide an output signal representative of a login state. Comparators 40 and 42 generate voltage signals OUT 0 and OUT 1, respectively, that will be evaluated by PUF evaluation engine 16 to provide bits of a multi-bit digital code. The multi-bit digital code can have any number of bits. After the voltage signal is provided to PUF evaluation engine 16, PUF system 18 may be turned off. PUF evaluation engine 16 then generates a logic bit of a digital code from the voltage signal.

PUF array 19 of the described embodiment requires a very small area on an integrated circuit when compared to an SRAM PUF. Also, because PUF 18 can be turned off or disabled after each use, the single-transistor PUF cells do not suffer as much from aging effects.

Figure 3:
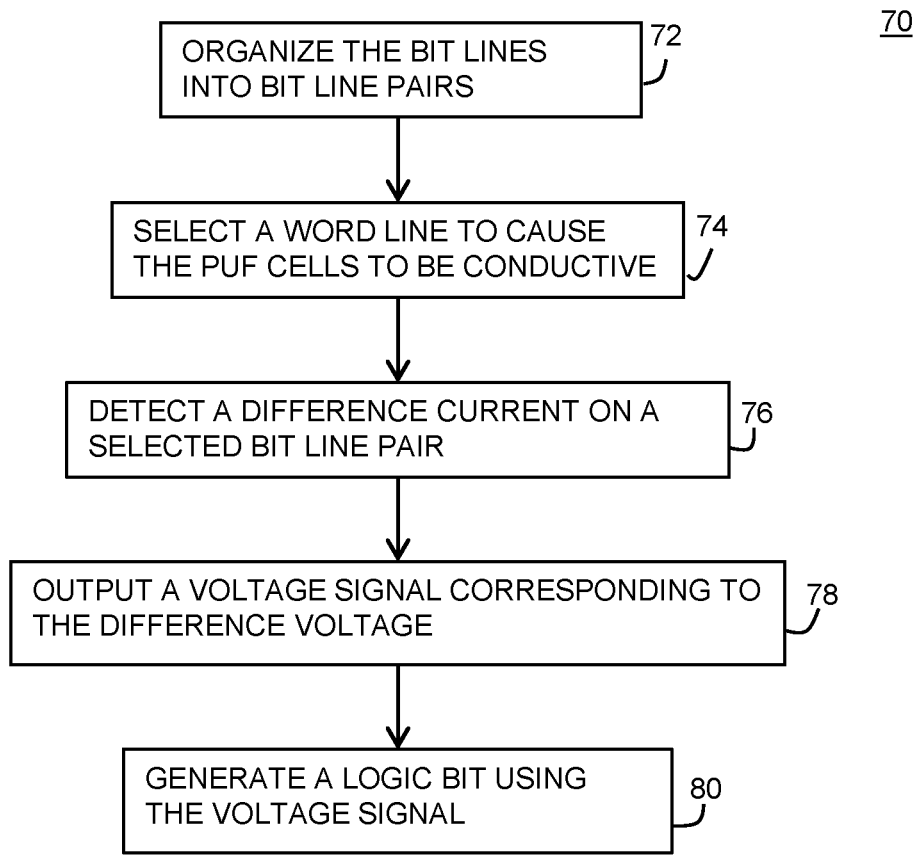
FIG. 3 illustrates a method for generating a PUF response in accordance with an embodiment.

FIG. 3 illustrates method 70 for generating a PUF response in accordance with an embodiment. Method 70 begins at step 72. At step 72, the bit lines of PUF array 18 are organized in pairs of bit lines. The pairs can be formed using adjacent bit lines, or by using a different organization. At step 74, one or more word lines are selected as described above in the embodiment of FIG. 2. Selecting a word line causes a voltage to be provided to the gates of the PUF cells, causing the PUF cells to be conductive and thereby coupling the bit line to a source line. A current will then flow from the bit line to the source. In one embodiment, a current source is implemented as part of the comparator. At step 76, the comparators connected to selected bit line pairs detect a difference voltage between the two bit lines of each of the bit line pairs. At step 78, a voltage signal labeled "OUT 0" and "OUT 1" are generated and output by comparators 40 and 42, respectively, in response to the difference current. Note that only two comparators are shown in FIG. 2 for illustration purposes. Another implementation may include more than two comparators. The voltage signal is provided from the comparators to PUF evaluation engine 16 (FIG. 1). At step 80, PUF evaluation engine 16 generates a logic bit using the voltage signal. The logic bit may be used to generate the DIGITAL CODE. The digital code may be used as a digital signature, encryption or decryption key, or the like.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a physically unclonable function (PUF) comprising an array of single-transistor N-channel PUF cells arranged in rows and columns, a row comprising a word line and all the PUF cells coupled to the word line, a column comprising a bit line and all the PUF cells coupled to the bit line, a method for generating a digital code, the method comprising:
   coupling a drain of each of the single-transistor N-channel PUF cells to a bit line, a source to a source line, and a gate to a word line;
   selecting a word line of the PUF array to cause the PUF cells in a row to be conductive;
   coupling a first bit line of a first column of the PUF array to a first input of a comparator;
   coupling a second bit line a second column of the PUF array to a second input of the comparator;
   connecting the source line directly to ground;
   detecting a difference current on the first and second bit lines using the comparator;
   outputting a voltage signal from the comparator corresponding to the difference current; and generating a logic bit using the voltage signal, the logic bit being a part of the digital code.

2. The method of claim 1, further comprising generating a current on the first and second bit lines using a current source coupled to each of the first and second bit lines before detecting the difference current.

3. The method of claim 1, further comprising receiving a challenge from a security module, wherein the digital code is generated in response to the challenge.

4. The method of claim 1, further comprising disabling the PUF after generating the logic bit.

5. The method of claim 1, wherein the array of single-transistor PUF cells includes a plurality of bit lines and a plurality of comparators, and wherein the method further comprises:
  organizing the plurality of bit lines into a plurality of bit line pairs; and
  coupling each bit line pair to one of the plurality of comparators.

6. The method of claim 5 further comprising a plurality of current sources, each current source having a first terminal coupled to a bit line of the plurality of bit lines, and a second terminal coupled to a power supply terminal for providing a positive power supply voltage.

7. The method of claim 1, wherein the PUF is implemented on an integrated circuit.

8. A method for generating a digital code using a physically unclonable function (PUF), the method comprising:
  providing an array of single-transistor N-channel PUF cells arranged in rows and columns, a row comprising a word line and all the PUF cells coupled to the word line, a column comprising a bit line and all the PUF cells coupled to the bit line, each of the single-transistor N-channel PUF cells having a drain terminal connected to one of a plurality of bit lines, a gate terminal coupled to one of a plurality of word lines, and a source terminal connected directly to ground;
  coupling a first terminal of a current source of a plurality of current sources to the bit line of each of the columns, and coupling a second terminal to receive a power supply voltage different from ground;
  selecting a word line to cause the PUF cells in a row to be conductive;
  coupling a first bit line of a first column of the PUF array to a first input of a comparator;
  coupling a second bit line of a second column of the PUF array to a second input of the comparator;
  detecting a difference current on the first and second bit lines using the comparator;
  outputting a voltage signal from the comparator corresponding to the difference current; and
  generating a logic bit using the voltage signal, the logic bit being a part of the digital code.

9. The method of claim 8, further comprising receiving a challenge from a security module, wherein the digital code is generated in response to the challenge.

10. The method of claim 8, further comprising disabling the PUF after generating the logic bit.

11. A physically unclonable function (PUF) comprising:
  a PUF array of single-transistor N-channel cells organized as a plurality of word lines intersecting a plurality of bit lines, a single-transistor cell coupled to a word line and a bit line at each of the intersections wherein a row of the PUF array comprises a word line and the single-transistor N-channel cells coupled to the word line and a column of the PUF array comprises a bit line and the single-transistor N-channel cells coupled to the bit line;
  a plurality of current sources, each current source having a first terminal coupled to a bit line of the PUF array, a second terminal coupled to receive a power supply voltage different from ground;
  a plurality of comparators, each comparator having a first input terminal coupled to the bit line of a first column of the PUF array, and a second input terminal coupled to the bit line of the second column of the PUF array, the second column being different than the first column, a comparator detecting a difference current on the bit lines first and second columns and outputting a voltage signal from the comparator corresponding to the difference current; and
  a PUF evaluation engine coupled to the PUF array, the PUF evaluation engine providing an address for selecting a word line of the PUF array in response to a challenge, wherein the PUF evaluation engine receives the voltage signal from a comparator and generating a logic bit.

12. The data processing system of claim 11, wherein the PUF array is disabled after the voltage signal is generated.

13. The data processing system of claim 11, further comprising a security module for generating the challenge, wherein the logic bit is one of a plurality of logic bits comprising a digital code, the digital code provided to the security module in response to the challenge.

* * * * *